US006769630B1

(12) United States Patent
Leipziger

(10) Patent No.: US 6,769,630 B1
(45) Date of Patent: Aug. 3, 2004

(54) NOZZLE SUPPORT WITH A CAP

(75) Inventor: Alfred Leipziger, Mainburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 166 days.

(21) Appl. No.: 10/049,835

(22) PCT Filed: Aug. 11, 2000

(86) PCT No.: PCT/EP00/07828

§ 371 (c)(1),
(2), (4) Date: Aug. 9, 2002

(87) PCT Pub. No.: WO01/12482

PCT Pub. Date: Feb. 22, 2001

(30) Foreign Application Priority Data

Aug. 17, 1999 (DE) ......................................... 199 38 992

(51) Int. Cl.$^7$ ................................................. B60S 1/52
(52) U.S. Cl. ...................................... 239/284.1; 248/93
(58) Field of Search .......................... 239/284.1, 284.2, 239/504, 552, 553, 553.5, 590, 590.5; 248/79, 81, 82, 92, 93

(56) References Cited

U.S. PATENT DOCUMENTS 6,354,515 B1 * 3/2002 Matsumoto et al. ..... 239/284.1

FOREIGN PATENT DOCUMENTS

| DE | 4401744 | 7/1994 |
| DE | 4328570 | 3/1995 |
| DE | 19920965 | 11/1999 |
| DE | 19938992 | 2/2001 |
| EP | 0508853 | 10/1992 |
| FR | 2705075 | 11/1994 |
| FR | 2749553 | 12/1997 |

OTHER PUBLICATIONS

International Search Report (and translation thereof).

* cited by examiner

Primary Examiner—Michael Mar
Assistant Examiner—Thach H Bui
(74) Attorney, Agent, or Firm—Crowell & Moring LLP

(57) ABSTRACT

A headlight washer device is equipped with a nozzle support, which can be adjusted in its cleaning position through an opening in the autobody. A cap for closing the opening is connected via elastic elements with the nozzle support in such a way that the cap aligns autonomously along the edge of the body opening during the retracting movement of the nozzle support.

28 Claims, 4 Drawing Sheets

NOZZLE SUPPORT WITH A CAP

BACKGROUND OF THE INVENTION

The invention relates to a nozzle support with a cap for a headlight washer device, a nozzle support assembly, and a method of making nozzle support assembly.

The cap is arranged on the nozzle support by a ball-and-socket joint and can thus align in the car body opening in such a way that the body opening in the retracted position of the nozzle support is closed with an even joint configuration and/or flush with the surface.

The task of the invention is to further develop the familiar nozzle support.

This task is resolved with the embodiments described as follows.

The present invention involves connecting the cap via at least one elastic element or via at least one swiveling axis with the nozzle support in such a way that after each cleaning operation and the subsequent movement of the nozzle support into its retracted position, the cap autonomously aligns along the edge of the body opening. This allows a tolerance compensation between the cap and the body part, independent from temperature conditions, tolerances and aging-related deformations of the affected polymer parts. Additionally, complex adjustment processes during the initial assembly or during repairs are eliminated because the centering of the cap in or along the body opening occurs automatically via the elastic elements or the swiveling axis/axes.

BRIEF DESCRIPTION OF THE DRAWINGS

Possible structural examples of the invention are depicted in the drawing and are described in more detail in the following drawings which show.

DETAILED DESCRIPTION OF THE DRAWINGS

Figure 1:
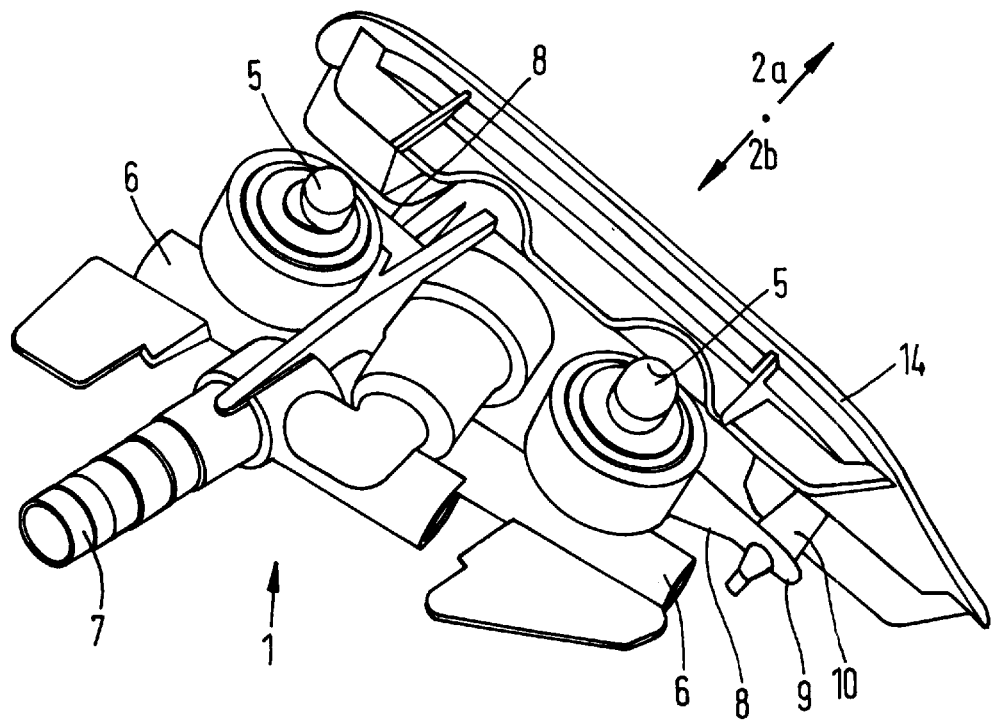
FIG. 1 a nozzle support with the invented connection of a cap via elastic elements, in a perspective view, FIG. 2 the object of the FIG. 1, in a cross-sectional view, FIG. 3 a version of a nozzle support that is comparable to those in FIGS. 1 and 2, in a perspective view, FIG. 4 the nozzle support from FIG. 3, in an exploded view, FIG. 5 the nozzle support from FIG. 3 in an assembled state, in a perspective view, FIG. 6 a nozzle support with the invented connection of a cap via helical springs, in a perspective view, FIG. 7 another structural example of the invention, with two swiveling axes of the cap that are arranged perpendicular to each other, in a perspective view, FIG. 8 the structural example from FIG. 7 in a schematic view and FIG. 9 the structural example from FIG. 7 in a sectional view.
Figure 2:
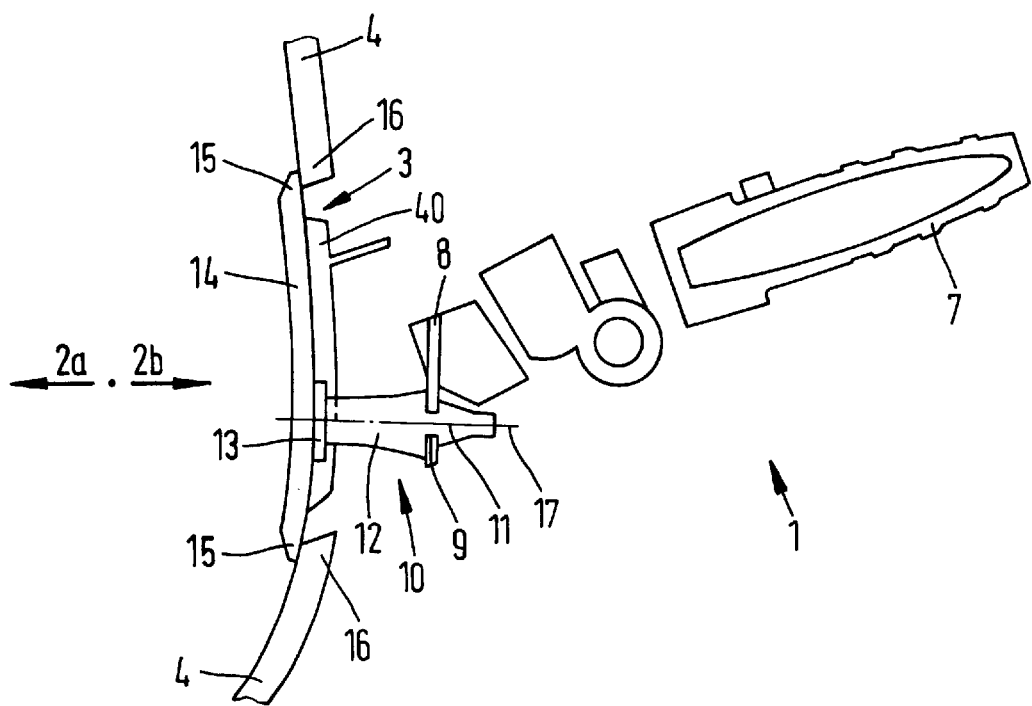

FIGS. 1 and 2 show a nozzle support 1 of a headlight washer device, which can be adjusted in the direction of the arrows 2a and 2b and, in doing so, penetrates an opening 3 of a body part 4 of the vehicle. The opening 3 is for example shown in a bumper 4. The nozzle support 1 contains two nozzles 5, which are supplied with a cleaning fluid via pipe 6 as well as a pipe bracket 7. Fastening devices 8 are provided on the nozzle support 1, with the ends of these devices containing ring-shaped seats 9, which mesh with the elastic elements 10. The elastic elements 10 consist, for example, of a rubber material or an elastomer synthetic. They have an elongated shape, with a longitudinal axis 17, and are inserted with their fastening areas 11 in the open circular seat 9 of the nozzle support 1 in an interlocking manner. The base areas 13 of the elements 10 are connected via an distance plate 40 with a cap 14, which closes the body opening 3 in the retracted state of the nozzle support 1.

When extending the nozzle support 1 in the direction of the arrow 2a, the nozzles 5 extend beyond the outline of the bumper 4. The elastic elements 10 are designed in such a dimensionally stable manner that they maintain the cap's 14 correct position in the extended state even at high driving speeds and accordingly great wind pressure. Retracting of the nozzle support 1 in the direction of the arrow 2b occurs until the protruding edge 15 of the cap 14 rests along the edge 16 of the body opening 3 and automatically takes on a center position, as is shown and described more closely with the help of FIG. 3 through 5. The elastic deformation sections 12 of the elements 10 thus cause a tolerance compensation in the plane of the bumper 4. Similarly, the cap 14 can also be lowered into the opening flush with bumper's 4 surface, wherein the centering creates an even joint configuration.

Figure 3:
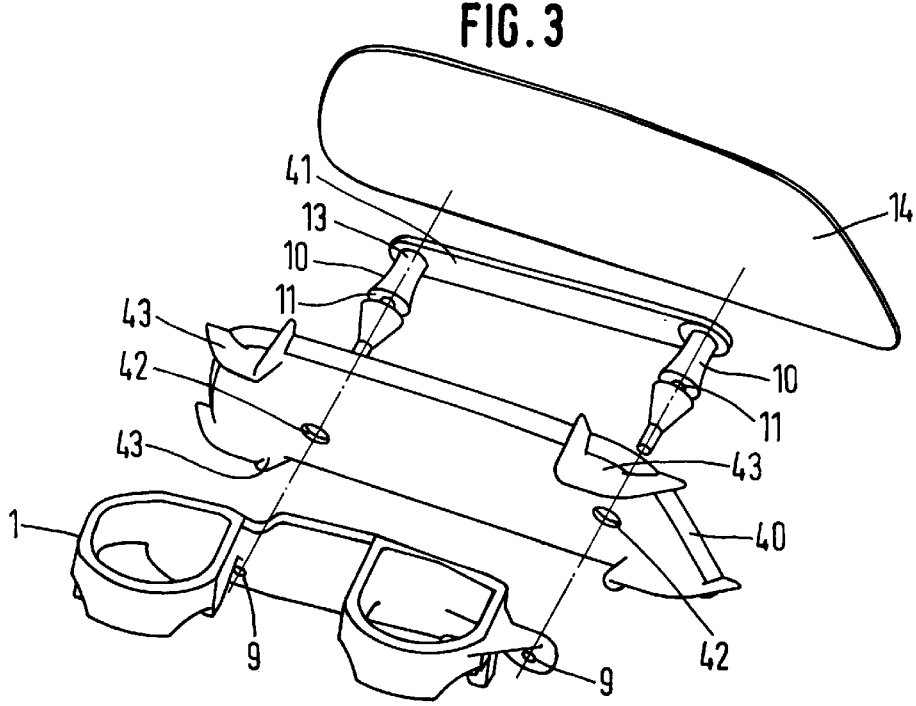
Figure 4:
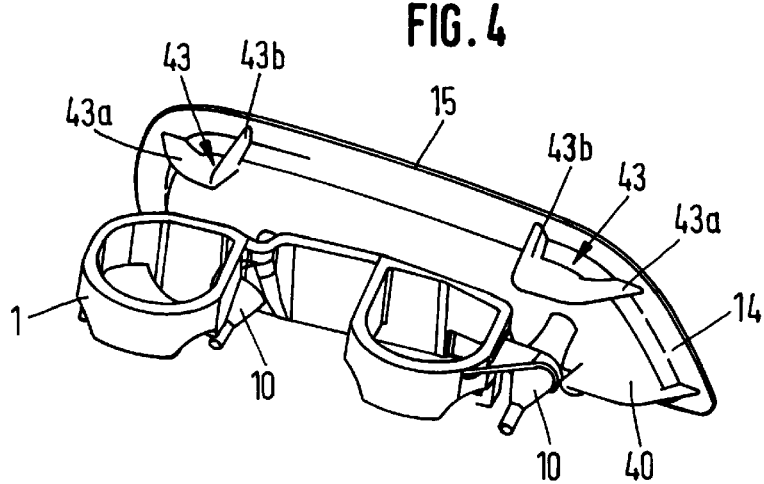
Figure 5:
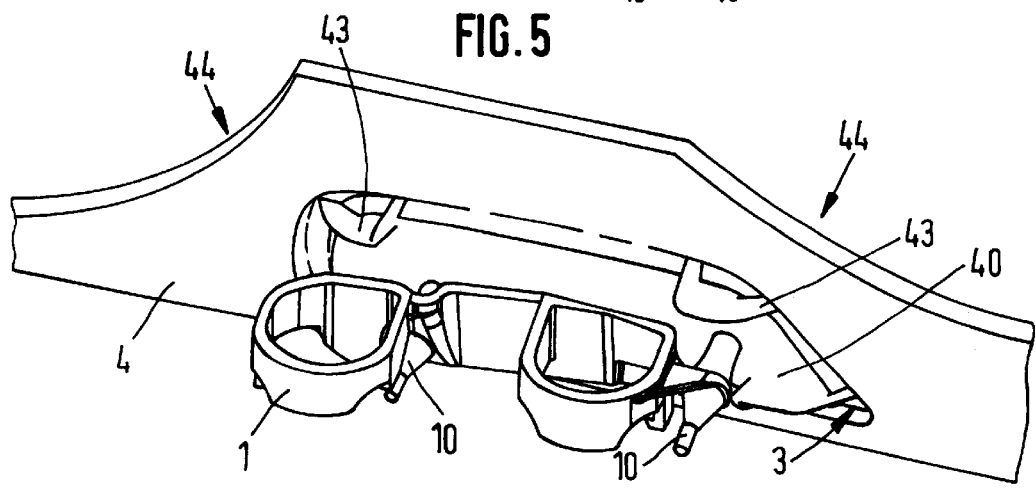

FIGS. 3 through 5 show structural examples of a nozzle support 1 where the cap 14 is connected with a distance plate, e.g. through gluing. Before the cap 14 and the distance plate 40 are connected, both elastic elements 10, whose base areas 13 are coupled via an element support 41, are pushed through openings 42 in the distance plate 40. The element support 41 is held flush with the surface in a recess in the front of the distance plate 40, as the cross-sectional view of FIG. 2 shows in more detail. The elastic elements 10 with their fastening areas 11 mesh with the openings 9 of the nozzle support, similar to the depiction in FIGS. 1 and 2.

In the corner areas of the distance plate 40 centering lugs 43, respectively, with two wings 43a and 43b, which are aligned at approximately right angles to each other, are provided. These wings protrude beyond the edge of the distance plate 40 and are arranged at a distance to the edge 15 of the cap 14 in the assembled state, as shown especially in FIG. 4. FIG. 5 depicts the installed position of the nozzle support 1, which is inserted in an opening 3 of a bumper 4 and is aligned by the centering lugs 43 in the center of this opening 3, wherein the edge 15 of the cap 14 overlaps the edge 16 of the opening 3 in the bumper 4. Notches 44 for holding the headlights, which are not shown, are located in the bumper 4 on both sides above the opening 3.

Figure 6:
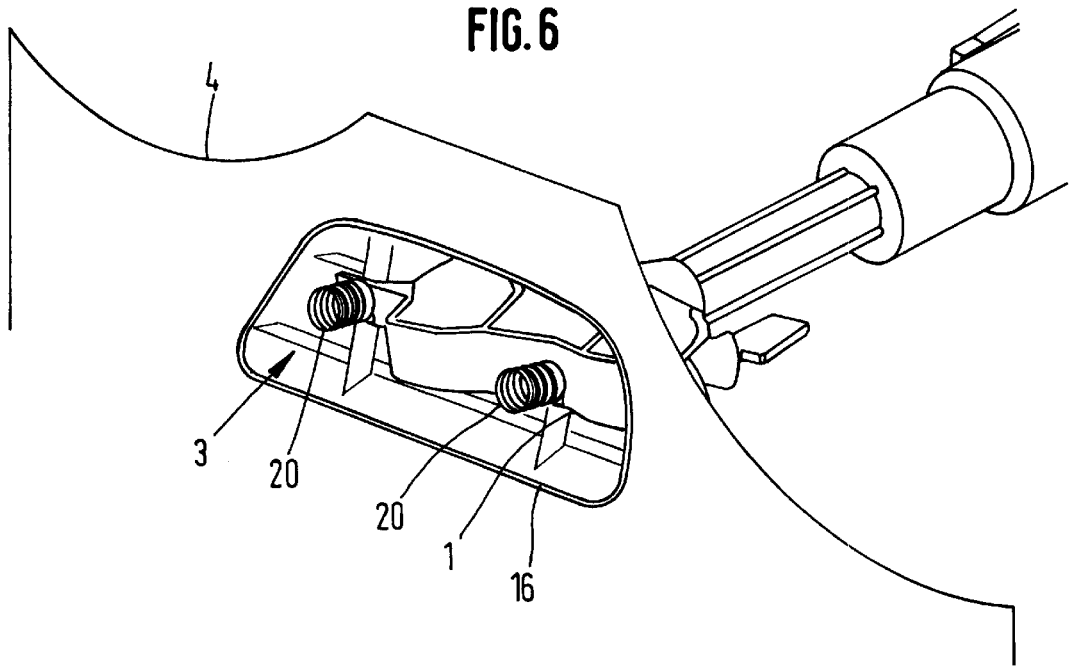

FIG. 6 shows a structural example of the invention where metallic helical springs 20 are used, instead of the elements 10 pursuant to FIGS. 1 through 5, for a cap, which is not shown here. The remainder of the configuration of the nozzle support 1 corresponds to the previous structural elements. In a similar fashion, the helical springs 20 affect an autonomous centering of the cap 14 along the edge 16 of the body opening 3. Instead of helical springs 20, other spring elements can also be used, including those made of non-metallic materials.

Figure 7:
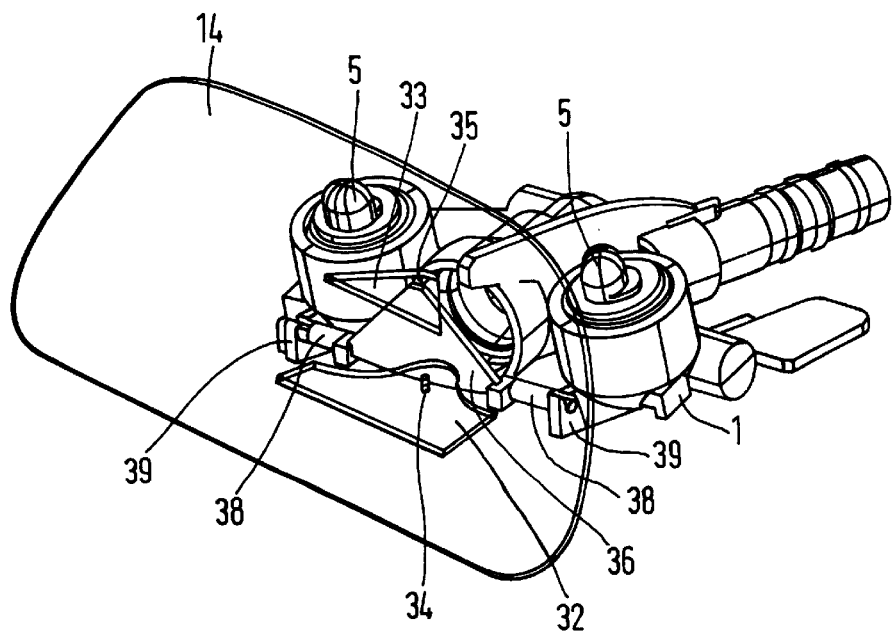
Figure 8:
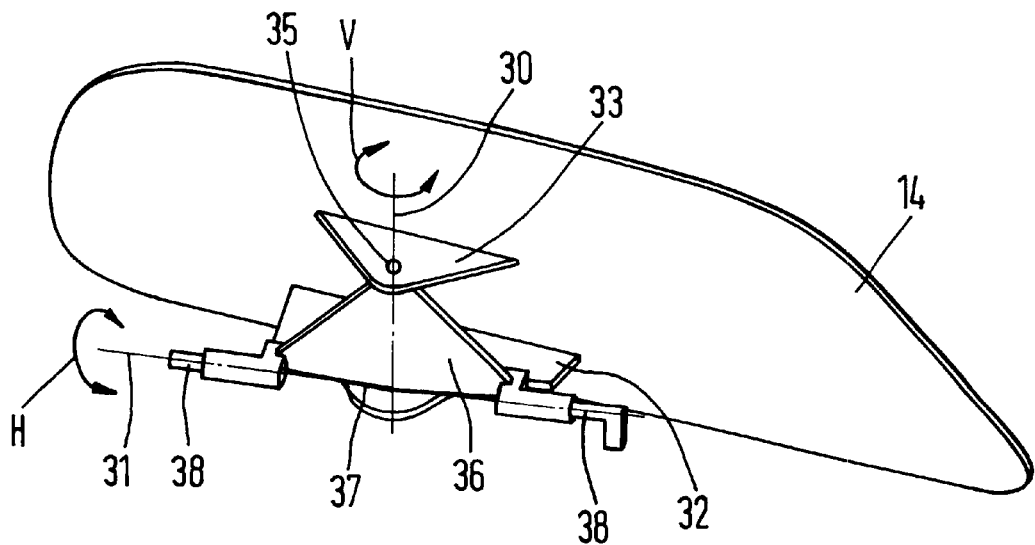
Figure 9:
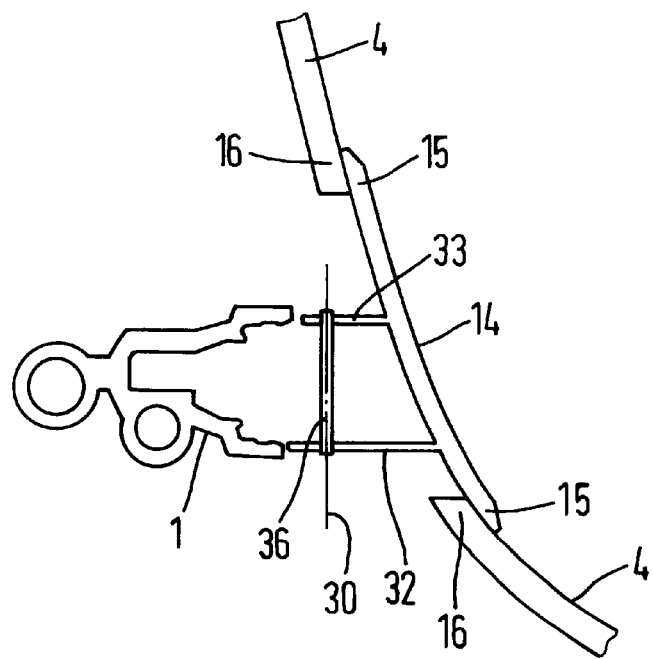

FIGS. 7 through 9 show another structural example of the invention where a swiveling connection of the cap 14 to the nozzle support 1 is implemented via a vertical and a horizontal swiveling axis. Two fastening brackets 32 and 33 are provided on the back of the cap 14; these brackets contain openings, which mesh with the pins 34 and 35 of a triangular swiveling part 36. The connecting line between the pins 34 and 35 defines the swiveling axis 30. In the extension of the base 37 of the swiveling part 36 studs 38 are provided, which establish the swiveling axis 37. The studs 38 mesh with the bearing parts 39 on the nozzle support 1. The rotational degrees of freedom of the cap 14 are also shown by the double arrows V and H.

Due to the two swiveling axes 30 and 31, the cap 14 can be aligned with the edge 16 of the body opening 3 during the retracting movement of the nozzle support 1, which allows a uniform support along the edge 16 to be achieved. In particular, this structural form of the invention is suited for such bumpers 4 or similar autobody parts 4, which do not have an even outline, because the cap 4 can align in accordance with the shape of the outline by the swiveling axes 30 and 31. In these cases, as shown in FIG. 9, the edge 15 of the cap 14 can have a greater protrusion beyond the edge 16 of the body opening 3 so that dimensional deviations in the position and/or size of the body opening 3 can certainly be compensated.

The connection of the cap 14 pursuant to FIG. 7 through 9 is suitable just as the above-described structural forms, equally to such mountings in which the cap 14 is immersed into an indentation of the body part 4. This allows an even joint configuration with the body opening 3 to be accomplished. Of course, the invention also allows for alignment of such caps 14 without a gap in relation to a body opening 3 that rest on the edge 16 of the body opening 3 with very little protrusion, as is shown in FIG. 2. Of course, a combination of elastic elements 10 (or helical springs 20 or the like) and swiveling axes 30 and/or 31 is also possible.

What is claimed is:

1. Nozzle support with a cap for a headlight washer device with at least one nozzle for cleaning the lens of a headlight of a motor vehicle, wherein the nozzle support can be adjusted from a retracted position through a repeater movement into an extended position and the nozzle support during this adjustment movement travels through a body opening, which in the retracted position of the nozzle support can be closed by the cap that is moved along with the nozzle support, wherein the cap is connected via at least one elastic element with the nozzle support in such a way that the cap aligns autonomously in the body opening or along the edge of the body opening during the retracting movement of the nozzle support, wherein the elastic element is elongated and is designed with a longitudinal axis that is roughly parallel to the direction of the adjustment movement of the nozzle support and on at least at one end section in such a way that it can be connected with a seat on the cap and/or the nozzle support.

2. Nozzle support of claim 1,
   wherein an end section of the elastic element is designed as a fastening area, which can be inserted into a circular seat of the nozzle support in an interlocking manner.

3. Nozzle support of claim 1,
   wherein the elastic element is made of a rubber material or an elastomer synthetic.

4. Nozzle support with a cap for a headlight washer device with at least one nozzle for cleaning a lens of a headlight of a motor vehicle, wherein the nozzle support can be adjusted from a retracted position through a repeater movement into an extended position and the nozzle support during this adjustment movement travels through a body opening, which in the retracted position of the nozzle support can be closed by the cap that is moved along with the nozzle support, wherein the cap is connected via at least one elastic element with the nozzle support in such a way that the cap aligns autonomously in the body opening or along the edge of the body opening during the retracting movement of the nozzle support, wherein the elastic element is formed by at least one helical spring of a metallic material whose longitudinal axis is roughly parallel to the direction of the adjustment movement of the nozzle support.

5. Nozzle support of claim 4,
   wherein the elastic element is connected with a distance plate, which in turn is arranged on the cap.

6. Nozzle support of claim 5,
   wherein the elastic element is pushed through an opening in the distance plate and has a base area, which is widened in relation to its elongated body and reaches behind the distance plate.

7. Nozzle support with a cap for a headlight washer device with at least one nozzle for cleaning a lens of a headlight of a motor vehicle, wherein the nozzle support can be adjusted from a retracted position through a repeater movement into an extended position and the nozzle support during this adjustment movement travels through a body opening, which in the retracted position of the nozzle support can be closed by the cap that is moved along with the nozzle support, wherein the cap is connected via at least one swiveling axis with the nozzle support in such a way that the cap aligns autonomously in the body opening or along the edge of the body opening during the retracting movement of the nozzle support.

8. Nozzle support of claim 7,
   wherein the cap is connected with the nozzle support via two swiveling axes, which are arranged roughly vertical to each other.

9. Nozzle support of claim 8,
   wherein at least one centering device is arranged on the cap and/or on the distance plate for aligning the cap in the body opening or along the edge of the body opening.

10. Nozzle support of claim 1,
    wherein the elastic element is connected with a distance plate, which in turn is arranged on the cap.

11. Nozzle support of claim 10,
    wherein the elastic element is pushed through an opening in the distance plate and has a base area, which is widened in relation to its elongated body and reaches behind the distance plate.

12. Nozzle support of claim 1,
    wherein at least one centering device is arranged on the cap and/or on the distance plate for aligning the cap in the body opening or along the edge of the body opening.

13. Nozzle support of claim 4,
    wherein at least one centering device is arranged on the cap and/or on the distance plate for aligning the cap in the body opening or along the edge of the body opening.

14. A nozzle support assembly for a headlight washer of a motor vehicle having a body opening, the assembly comprising:
    a nozzle support;
    a cap; and
    an elongated elastic element having an axis, the elongated elastic element connecting the cap to the nozzle support;
    wherein the assembly is moveable through the body opening between a retracted position and an extended position, and wherein at the retracted position, the elastic element allows the cap to align autonomously with the body opening to cover the body opening, and wherein the axis is generally parallel to the direction of movement of the nozzle support assembly.

15. The nozzle support assembly of claim 14, wherein the elastic element has an end section having a fastening area that is insertable into a circular seat of the nozzle support in an interlocking manner.

16. The nozzle support assembly of claim 14 further comprising a distance plate, wherein the elastic element is connected to the distance plate, and the distance plate is connected to the cap.

17. The nozzle support assembly of claim 14, wherein the elastic element can be pushed through an opening of the distance plate and has a base area, which is widened in relation to its elongated body and is between the cap and the distance plate.

18. The nozzle support assembly of claim 14 further comprising a centering device arranged on at least one of the cap and the distance plate for aligning the cap with the body opening.

19. A nozzle support assembly for a headlight washer of a motor vehicle having a body opening, the assembly comprising:
   nozzle support;
   a cap; and
   a helical spring having an axis, the helical spring connecting the cap to the nozzle support;
   wherein the nozzle support assembly is movable through the body opening between a retracted position and an extended position, and wherein at the retracted position, the helical spring allows the cap to align autonomously with the body opening to cover the body opening, and wherein the axis is generally parallel to the direction of movement of the nozzle support assembly.

20. The nozzle support assembly of claim 19 further comprising a distance plate, wherein the helical spring is connected to the distance plate, and the distance plate is connected to the cap.

21. The nozzle support assembly of claim 19 further comprising a centering device arranged on at least one of the cap and the distance plate for aligning the cap with the body opening.

22. A nozzle support assembly for a headlight washer of a motor vehicle having a body opening, the assembly comprising:
   a nozzle support;
   a cap; and
   a swiveling axis connecting the cap to the nozzle support;
   wherein the nozzle support assembly is movable through the body opening between a retracted position and an extended position, and wherein at the retracted position, the swiveling axis allows the cap to align autonomously with the body opening to cover the body opening.

23. The nozzle support assembly of claim 22 further comprising another axis connecting the cap to the nozzle support, wherein the two swiveling axes are arranged generally vertical to each other.

24. The nozzle support assembly of claim 22 further comprising a centering device arranged on at least one of the cap and the distance plate for aligning the cap with the body opening.

25. A method of making a nozzle support assembly for a headlight washer of a motor vehicle having a body opening, the nozzle support assembly being movable through the body opening between a retracted position and an extended position, the method comprising:
   flexibly connecting a nozzle support of the nozzle support assembly to a cap of the nozzle support assembly, wherein at the retracted position, the cap can be autonomously aligned with the body opening to cover the body opening.

26. The method of claim 25, wherein flexibly connecting the nozzle support to the cap includes flexibly connecting the nozzle support to the cap using an elongated elastic element having an axis that is generally parallel to the direction of movement of the nozzle support assembly.

27. The method of claim 25, wherein flexibly connecting the nozzle support to the cap includes flexibly connecting the nozzle support to the cap using a helical spring having an axis that is generally parallel to the direction of movement of the nozzle support assembly.

28. The method of claim 25, wherein flexibly connecting the nozzle support to the cap includes flexibly connecting the nozzle support to the cap using a swiveling axis.

* * * * *